(12) United States Patent
Long

(10) Patent No.: US 9,499,105 B1
(45) Date of Patent: Nov. 22, 2016

(54) SAFE TANK

(71) Applicant: Joel P. Long, Amarillo, TX (US)

(72) Inventor: Joel P. Long, Amarillo, TX (US)

( * ) Notice: Subject to any disclaimer, the term of this patent is extended or adjusted under 35 U.S.C. 154(b) by 0 days.

(21) Appl. No.: 14/621,928

(22) Filed: Feb. 13, 2015

Related U.S. Application Data

(60) Provisional application No. 61/939,978, filed on Feb. 14, 2014.

(51) Int. Cl.
*B60R 9/06* (2006.01)
*F17C 13/08* (2006.01)

(52) U.S. Cl.
CPC .............. *B60R 9/06* (2013.01); *F17C 13/084* (2013.01); *F17C 2205/0107* (2013.01); *F17C 2205/0157* (2013.01); *F17C 2205/0192* (2013.01)

(58) Field of Classification Search
CPC ........... B60R 9/00; B60R 9/06; B60R 11/00; B60R 11/06; B60R 7/02; F17C 13/084; F17C 2205/0107; F17C 2205/0157; F17C 2205/0192
USPC ...................... 224/281, 42.36, 554, 510, 310; 296/26.09
See application file for complete search history.

(56) References Cited

U.S. PATENT DOCUMENTS

| | | | |
|---|---|---|---|
| 3,753,543 A | 8/1973 | Burrell et al. | |
| 3,765,636 A * | 10/1973 | Burrell | F17C 13/084 248/313 |
| 4,006,852 A | 2/1977 | Pilsner et al. | |
| 4,770,428 A * | 9/1988 | Sugiyama | F17C 13/085 224/401 |
| 4,860,986 A * | 8/1989 | Couzens | B60N 3/103 248/310 |
| 5,025,935 A | 6/1991 | Hadachek | |
| 5,427,487 A * | 6/1995 | Brosfske | B60P 7/15 410/121 |
| 5,558,246 A * | 9/1996 | Ross, Jr. | A47F 7/28 220/4.22 |
| D389,896 S | 1/1998 | Salvucci, Sr. | |
| 5,799,849 A | 9/1998 | Beer et al. | |
| 6,863,198 B1 | 3/2005 | Darby | |
| 7,121,603 B2 * | 10/2006 | Stevenson | B60P 1/003 296/26.09 |
| 2002/0014505 A1 * | 2/2002 | Lance | B60P 3/14 224/404 |
| 2005/0121572 A1 * | 6/2005 | Mascarenhas | B66F 9/07518 248/218.4 |
| 2007/0090117 A1 | 4/2007 | Terry | |
| 2007/0114257 A1 | 5/2007 | Brown | |
| 2007/0152002 A1 | 7/2007 | Dollar, Jr. | |
| 2012/0280473 A1 * | 11/2012 | Andersen | B60D 1/06 280/511 |

* cited by examiner

*Primary Examiner* — Corey Skurdal

(57) ABSTRACT

The present invention relates to a tank holder system that does not substantially restrict alternative uses of truck bed space when the tank holder system is not in use. The tank holder system includes a tank holder and a base, which receives the tank holder and secures the tank holder during transportation. The tank holder includes an arcuate cradle formed to accept cylindrically-shaped tanks and fasteners that secure such tanks in the arcuate cradle. When the tank holder is not in use, it can be removed from the base. The base remains attached to the truck bed. This allows the space in the truck bed to be used for alternative purposes when the tank holder is disengaged from the base, while allowing the tank holder to be quickly and easily re-engaged to the base.

6 Claims, 3 Drawing Sheets

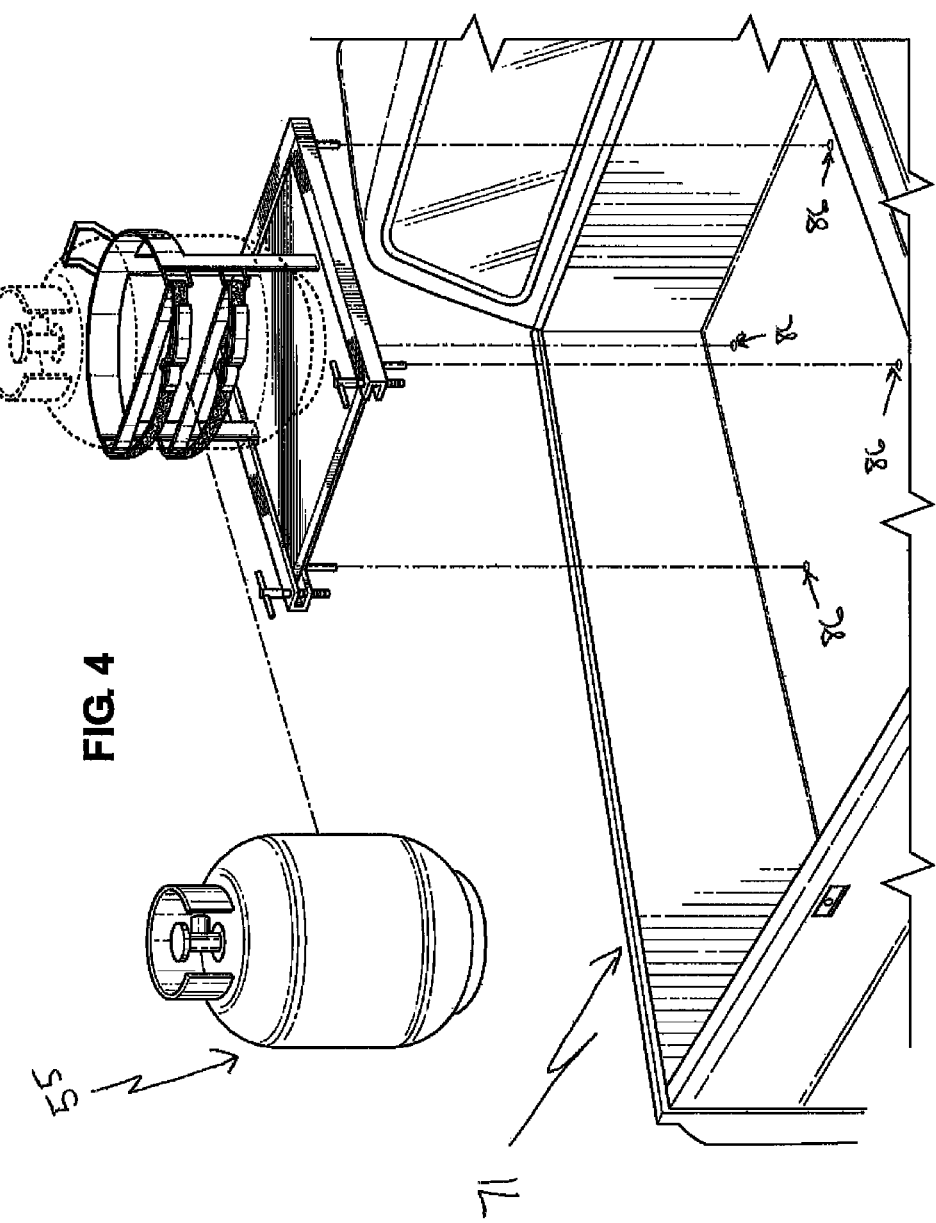

SAFE TANK

BACKGROUND OF THE INVENTION

Field of the Invention

The present invention is directed to the field of gas tank holders used in the transportation of gas tanks, and more specifically to tank holders carrying propane gas tanks in the bed of a pickup truck, such that the gas tank holder securing a tank may be easily removed from the bed of the pickup truck.

Brief Description of the Related Art

Transporting canisters or tanks containing pressurized, flammable gas can be extremely dangerous, as one small leak or dent in a tank could cause an explosion. There have been a number of proposed holders and racks that secure tanks in various positions and locations in a motor vehicle to prevent gas tanks from rolling around or contacting other tanks during transport. The proposed holders and racks vary in structure, size, and orientation.

U.S. Pat. No. 5,025,935 to Hadachek teaches a support structure for holding tanks, which includes a platform and a vertically extending stabilizing cradle wherein a strap or similar attachment device is used to retain a tank within the cradle when a tank is mounted on the platform. U.S. Pat. No. 6,863,198 to Darby teaches a similar structure wherein the vertical stabilizing cradle clamps to the upper lip of the wall of a pickup truck's bed. This is different from Hadachek, where the support structure engaged the wall of the pickup truck bed through a spring-loaded vertically extending stabilizing cradle that pressingly engaged the upper lip of the wall. U.S. Pat. No. 5,558,246 to Ross, Jr. teaches a tank holder that does not attach to the wall of pickup truck's bed at all, but instead attaches directly to the floor of a transport. U.S. Design Pat. No. D389,896 depicts the design of a tank holder stand that does not attached to any surface.

U.S. Pat. No. 5,558,246 to Ross, Jr. and U.S. Pat. No. 3,753,543 to Burrell et al. each suggest two non-adjustable belt-like structures, equal in circumference, for engaging a tank to the support structure. U.S. Pat. No. 4,006,852 to Pilsner et al. similarly suggests two non-adjustable belt-like structures, but the circumferences of the two belt structures are not equal, so that one belt-like structure may engage the larger circumference of the tank and the second belt-like structure may engage the smaller circumference of the tank base.

There remains a practical need for a tank holder that functions sufficiently to secure and protect a gas tank during transit, while not significantly inhibiting the use of the bed of the pickup truck. While the gas tank holders taught in the prior art allow for the removal of the respective holders from the bed of the pickup truck, either from the wall or floor of a pickup truck bed, any such removal would be burdensome and time-consuming. Returning the tanker holder back into the pickup truck bed would require similar effort.

SUMMARY OF THE INVENTION

The present invention is directed to a tank holder system comprising a base and a tank holder that slidably engages the base through a channel in opposing tracks of the base. The tank holder can be removed from the base, which remains attached to the pickup truck bed by studs attached to the bottom of the base. In use, the tank holder engages the base to secure and prevent a gas tank from being jostled during transit. When the holder is removed from the base during non-use, the low profile of the base takes up minimal space, permitting substantially unimpeded use of the pickup truck bed. Re-engaging the holder into the base requires minimal effort.

The base consists of two opposing tracks that are generally C-shaped. A third track is similarly C-shaped and positioned between the opposing tracks, so as to force the tank holder to slidably engage only from the front end of the base opposite the third track. The studs allow the base to engage the pickup truck bed. The general C-shape of the tracks creates channels in which the tank holder can slidably engage.

The tank holder consists of an arcuate cradle attached to a platform. An upper fastener attached to opposing terminal ends of the arcuate cradle secures a tank nested in the cradle. A lower fastener is attached to the opposing terminal ends of the cradle below the upper fastener to compensate for tanks of varying heights and to provide extra support. The upper and lower fastener can be a separable fastening device, seat belt, or another similar device. A handle is attached to the arcuate cradle to provide a comfortable means in which to carry the tank holder.

The tank holder inserts between the front end of the base, slidably engaging the channels of the opposing tracks, and is stopped when fully engaging the a channel of the third track.

A method of securing the tank holder to the base includes threadingly engaging a T-bolt through an upper and lower bolt hole located in the upper and lower lip, respectively, of the front ends of the opposing tracks. When the T-bolts are threadingly engaged, the tank holder is prevented from disengaging from the base.

The base remains attached to the bed of a pickup truck, but the tank holder can be removed from the base when not in use. As a result, the use of the pickup truck bed for purposes other than transporting tanks is not significantly impeded. The relatively short height of the base will allow a substantially larger volume of space to be used than if the tank holder system, including the arcuate cradle, remained attached to the pickup truck bed.

BRIEF DESCRIPTION OF THE DRAWINGS

A better understanding of the invention will be had with reference to the attached drawings, wherein:

FIG. 4 is a perspective view of the tanks holder system, wherein a tank is engaged in the tank holder system, and the tank holder system is engaged in a truck bed.

DETAILED DESCRIPTION

Figure 1:
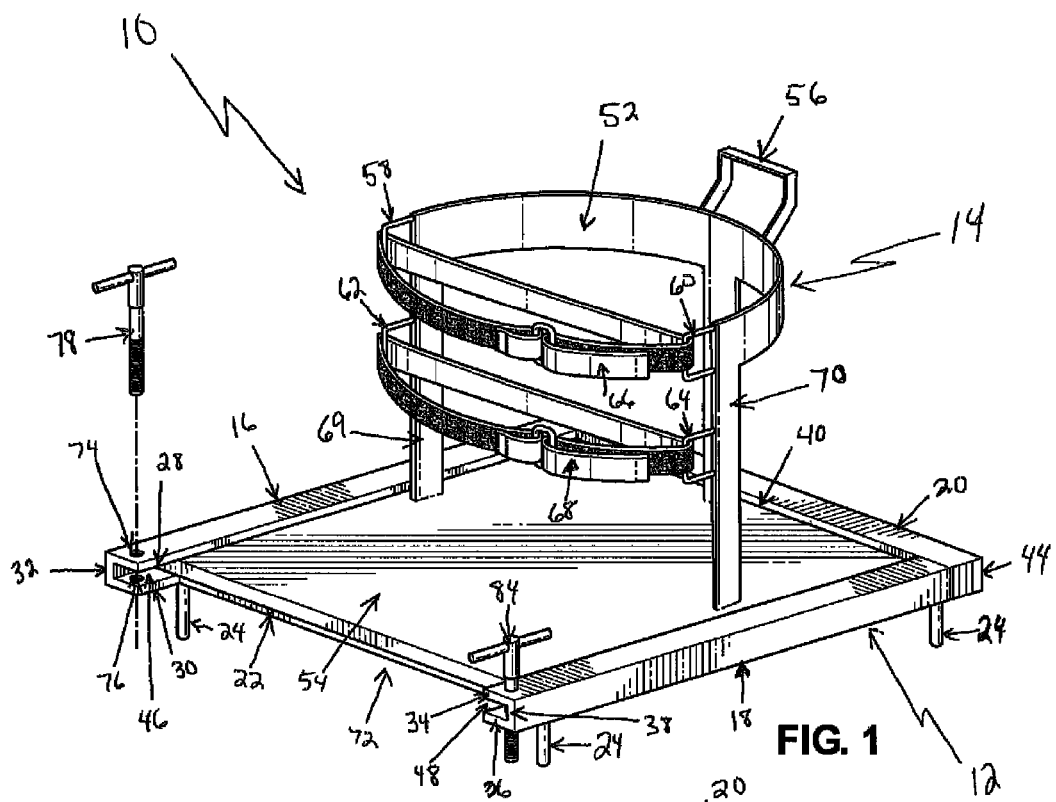
FIG. 1 is a perspective view of the tank holder system, wherein the tank holder is engaged in the base.
Figure 2A:
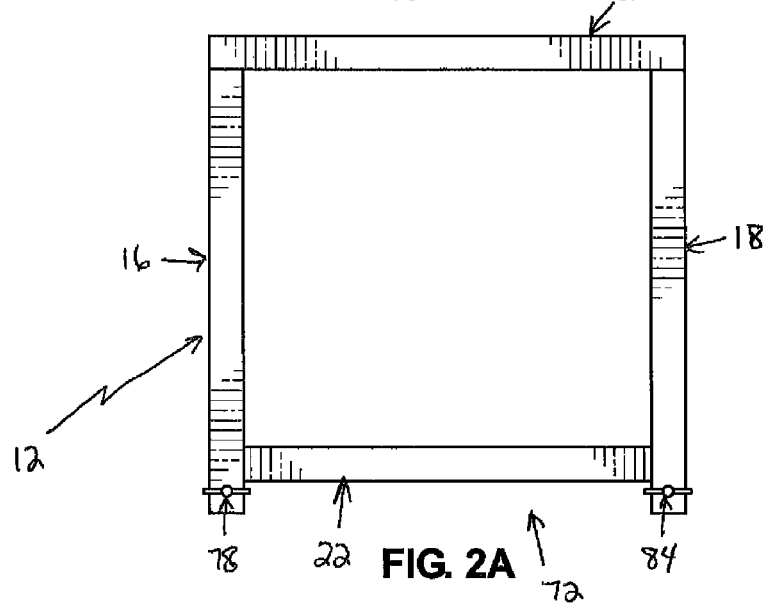
FIG. 2A is a top view of the base.
Figure 2B:
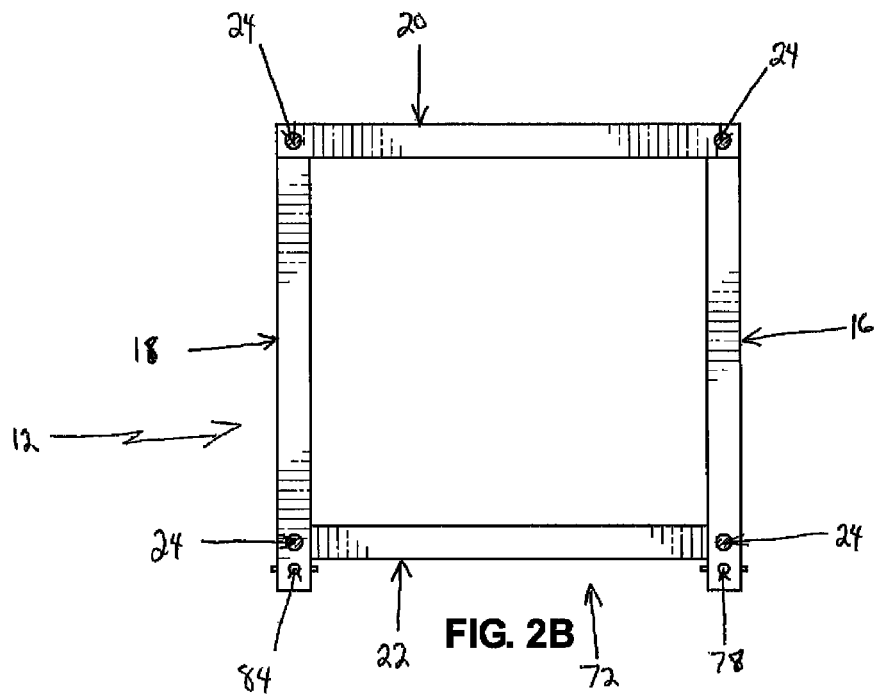
FIG. 2B is a bottom view of the base.

The present invention is directed to a tank holding system 10, comprising of a base 12 and a tank holder 14.

The base 12 includes a track 16 and a second track 18 with U-shaped cross-sections, a third track 20 with a U-shaped cross-section, a support member 22, and studs 24. Track 16 includes an upper lip 28, a lower lip 30, and a support 32. The second track 18 includes a second upper lip 34, a second lower lip 36, and a second support 38. The third track 20 includes a third upper lip 40, a third lower lip 42, and a third support 44.

Components of the track are oriented such that the support 32 is positioned between the upper lip 28 and lower lip 30, such that the track 16 is generally U-shaped and creates a channel 46. The second support 38 is positioned between the second upper lip 34 and second lower lip 36, such that the second track 18 is generally U-shaped and creates a second channel 48. The third support 44 is positioned between the third upper lip 40 and third lower lip 42, such that the third track 20 is generally U-shaped and creates a third channel 50.

Components of the base 12 are oriented such that track 16 and second track 18 oppose each other, and the channel 46 and the second channel 48 inwardly face each other. The third track 20 and support member 22 are positioned between and connect the track 16 and the second track 18, such that the third track 20 and support member 22 oppose each other. The third track 20 is further positioned such that the third channel 50 inwardly faces the channel 46 and second channel 48. The studs 24 are positioned along the bottom of the track 16, second track 18, and third track 20.

The tank holder 14 includes an arcuate cradle 52 and a platform 54, which together hold a tank 55. The arcuate cradle 52 includes a handle 56, a set of upper loops, 58 and 60, respectively, a set of lower loops, 62 and 64, respectively, an upper fastener 66, and a lower fastener 68.

Components of the tank holder 14 are positioned such that the arcuate cradle 52 is attached to the platform 54. The handle 56 is attached to the arcuate cradle 52 such that the handle 56 would not interfere with the insertion of the tank 55 into the arcuate cradle 52.

The set of upper loops 58 and 60 are attached to opposing terminal ends, 69 and 70, respectively, of the arcuate cradle 52. In FIG. 1, upper loop 58 is attached to terminal end 69, while upper loop 60 is attached to terminal end 70, but either upper loop 58 or 60 could be attached to either terminal end 69 or 70. The set of lower loops 62 and 64 are attached to opposing terminal ends, 69 and 70, respectively, of the arcuate cradle 52. In FIG. 1, lower loop 62 is attached to terminal end 69, while lower loop 64 is attached to terminal end 70, but either lower loop 62 or 64 could be attached to either terminal end 69 or 70. The set of lower loops 62 and 64 are attached to their respective terminal ends 69 and 70 below the set of upper loops 58 and 60. The upper fastener 66 attaches at either end to upper loops 58 and 60. The lower fastener 68 attaches at either end to lower loops 62 and 64.

The tank 55 may vary in height and circumference, but will generally have a circular cross-section. The typical embodiment of the tank 55 will be a portable propane tank, but is not limited to such a tank. While attached to the tank holder 14, the tank 55 sits on top of the platform 54 while resting against the arcuate cradle 52. The upper and lower fasteners, 66 and 68, respectively, are tightened to secure the tank 55 in the arcuate cradle 52.

The tank holder 10 system operates by slidably engaging the tank holder 14 into the base 12, which is attached to a surface, such as a truck bed 71. The tank holder 14 slidably engages the base 12 along the platform 54 at an open end 72 of the base, which opposes the third track 20. The platform 54 slidably engages the channel 46 and second channel 48 along the length of the track 16 and second track 18. The platform 54 then slidably engages the third channel 50 along the length of the third track 20.

The tank holder 14 secures a tank to the arcuate cradle 52. The platform 54 is a generally rectangular surface that provides vertical support to the tank, while the arcuate cradle 52 prevents a tank from moving horizontally once the tank is secured. The upper fastener 66 and lower fastener 68 secure a tank to the arcuate cradle 52 to prevent the tank from disengaging the arcuate cradle 52. In FIG. 1, the handle 56 is attached to the arcuate cradle 52 to help transport the tank holder 14 while it is disengaged from the base 10. However, the handle 56 may also be attached at other locations on the tank holder 14, such as the platform 54, to help slidably disengage the tank holder 14 from the base 12.

In the embodiment shown in FIG. 1, the upper fastener 66 and lower fastener 68 are, but not limited to, separable fastening devices capable of being adjusted to secure tanks of different circumferences. Alternatively, the upper and lower fasteners, 66 and 68, respectively, may also be two separate straps connected by a steel loop, or a structure similar to a two-point seat belt.

A means exists to secure the tank holder 14 to the base 12. In the embodiment shown in FIG. 1, an upper bolt hole 74 and a lower bolt hole 76 are positioned on the track 16 in the upper lip 28 and lower lip 30, respectively. A second upper bolt hole 80 and a second lower bolt hole 82 are positioned on the second track 18 in the second upper lip 34 and second lower lip 36, respectively. The upper bolt hole 74 and lower bolt hole 76 threadingly receive a T-bolt 78, and the second upper bolt hole 80 and second lower bolt hole 82 threadingly receive a second T-bolt 84. The upper and lower bolt holes, 74 and 76, respectively, are located along the track 16 near the open end 72 of the base. The second upper and lower bolt holes, 80 and 82, respectively, are located along the second track 18 near the open end 72 of the base. The platform 54 is prevented from slidably disengaging the channel 46 and second channel 48 when the T-bolt 78 threadingly engages the upper bolt hole 74 and lower bolt hole 76, and the second T-bolt 84 threadingly engages the second upper bolt hole 80 and second lower bolt hole 82.

Figure 3:
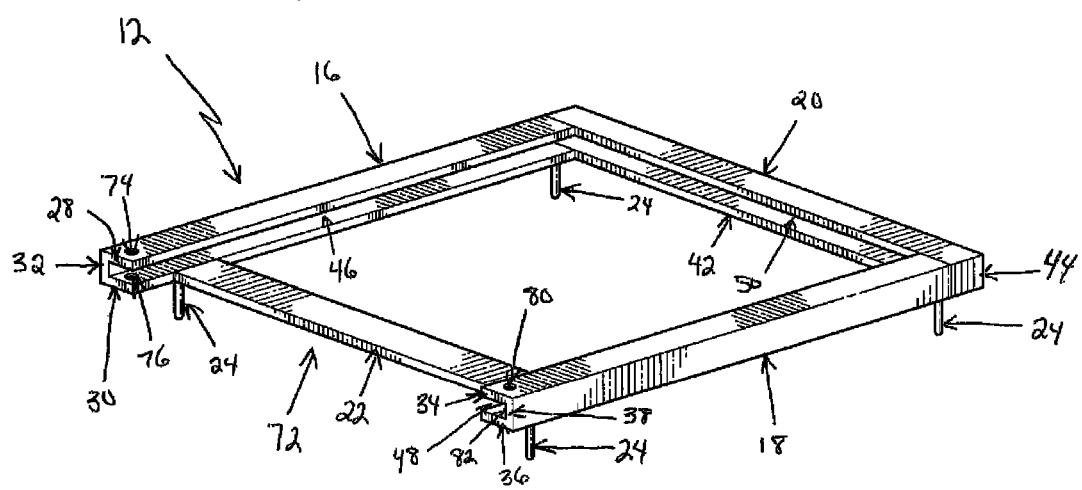
FIG. 3 is a perspective view of the base.

In the embodiment shown in FIGS. 1 and 3, studs 24 are placed on the bottom of the base 12 on the track 16 near the open end 72, on the second track 18 near the open end 72, where the first track 16 connects to the third track 20, and where the second 18 track connects to the third track 20. While there is no prescribed number of studs 24, more studs generally provide more support and stability to the base 12 attached to a surface, which in turn better supports the entire tank holder system.

As shown in the embodiment described FIG. 4, the base 12 engages the truck bed 71 with the four studs 24 positioned on the bottom of the base 12 to provide stability and support to the tank holder 14. The studs 24 line up with a corresponding holes 86 in the truck bed 71. The studs 24 slidably engage the holes 86 to secure the base 12 to the truck bed 71.

I claim:

1. A tank holder system comprising:
   a base having two opposing tracks, with each of the opposing tracks having an upper lip and a lower lip and a vertical support positioned in between the upper lip and lower lip, a support member positioned between the two opposing tracks, a third track with an upper lip and a lower lip and a vertical support positioned in between the upper lip and lower lip positioned between the two opposing tracks, and studs permanently attached to the two opposing tracks, wherein the studs are configured to secure the two opposing tracks to a bed of a vehicle by slidably engaging the bed downward through two or more holes in the bed;
   a tank holder having an arcuate cradle attached to a platform, wherein the platform slidably engages to the base between the upper and lower lip of the two opposing tracks;
   an upper bolt hole located in the upper lip and a lower bolt hole located in the lower lip of at least one of the same opposing tracks, wherein the upper bolt hole and the lower bolt hole are threaded;

a threaded T-bolt, wherein the threaded T-bolt secures the platform to the base once engaged by threading through the upper bolt hole and the lower bolt hole;

an upper fastener attached at either end to the arcuate tank cradle, wherein a length of the upper fastener is adjustable; and a lower fastener attached at either end to the arcuate tank cradle, wherein a length of the lower fastener is adjustable.

2. The tank holder system of claim 1 wherein a handle is attached to the tank holder.

3. The tank holder system of claim 2 wherein the handle is attached to the arcuate cradle.

4. The tank holder system of claim 1 wherein the arcuate cradle is configured to secure a tank.

5. The tank holder system of claim 1 wherein the upper fastener is separable from the arcuate tank cradle and the lower fastener is separable from the arcuate tank cradle.

6. The tank holder system of claim 1, wherein the upper fastener and the lower fastener are non-rigid.

* * * * *